(12) United States Patent
Winters

(10) Patent No.: US 6,654,552 B1
(45) Date of Patent: Nov. 25, 2003

(54) CAMERA CAP FOR AN INTRA ORAL CAMERA

(75) Inventor: William P. Winters, New Rochelle, NY (US)

(73) Assignee: Wolf X-Ray Corporation, West Hempstead, NY (US)

( * ) Notice: Subject to any disclaimer, the term of this patent is extended or adjusted under 35 U.S.C. 154(b) by 0 days.

(21) Appl. No.: 10/241,932

(22) Filed: Sep. 11, 2002

(51) Int. Cl.⁷ .............................................. G03B 29/00
(52) U.S. Cl. ......................................... 396/16; 433/29
(58) Field of Search ................................ 396/16; 433/29

(56) References Cited

U.S. PATENT DOCUMENTS

| 5,016,098 A | * | 5/1991 | Cooper et al. ................. 348/66 |
| 5,487,661 A | * | 1/1996 | Peithman ..................... 433/29 |

* cited by examiner

*Primary Examiner*—David M. Gray
(74) *Attorney, Agent, or Firm*—John L. Rogitz

(57) ABSTRACT

A camera cap for an intra oral camera includes a base plate from which a first side plate and a second side plate extend. The base plate forms a hole. The camera cap establishes an interior surface on which an adhesive layer is disposed. The camera cap can be installed on the head of an intra oral camera to block any light produced by the head of the camera while allowing imaging of, e.g., an x-ray, through the hole in the base plate.

22 Claims, 2 Drawing Sheets

CAMERA CAP FOR AN INTRA ORAL CAMERA

FIELD OF THE INVENTION

The present invention relates to intra oral cameras.

BACKGROUND OF THE INVENTION

Dental x-rays are extremely valuable tools that can be used by dentists to examine and diagnose patients' teeth and gums. By using dental x-rays, a dentist can view tooth and gum anatomy that is otherwise invisible to the naked eye. Dental x-rays can also be used to inform and educate patients regarding the health of their teeth, gums, and other related oral anatomy.

Conventional dental x-rays are taken using relatively small films for obtaining views of one or two teeth or for obtaining panoramic views of a patient's teeth and gums. These films are exposed using a dental x-ray machine; processed using specialty developer, fixer solutions, and equipment; and viewed on a light box in their original size and shape. Thus, to view x-rays for, e.g., showing a patient a particular feature of his or her teeth, the person desiring to see the image must stand in front of the viewing box.

Recently two additional methods for capturing the same information have emerged in the dental industry. The first method utilizes an electronic sensor upon which data is recorded. The sensor captures the data when it is exposed by a dental x-ray machine. Then, the captured data can be interpreted by software into an image that is presented on a monitor. Images captured in this manner can be viewed in far larger sizes than conventional dental x-ray film, and the monitors can, if desired, be conveniently positioned near dental chairs for viewing by patients as they sit in the chair. Moreover, brightness and contrast adjustments can be made to these images. These images can also be stored on a disk or hard drive, printed on paper, or transmitted electronically.

The second dental imaging method that has emerged in the dental industry includes the use of phosphor sensor plates that are approximately the same size as conventional dental x-ray film. These plates can be exposed via a dental x-ray machine and placed inside a special scanner that reads the image off the plate and transmits the image to a software program that presents the image at a monitor. The plates can then be erased and re-used.

In each of these methods, images are captured using means other than dental x-ray film and the images can be displayed at a monitor. Further, since each alternative dental imaging method utilizes technologies different than standard dental imaging, a dental office must add new equipment, e.g., computers, monitors, printers, scanners, sensors, imaging plates, etc. The transition from standard dental x-ray imaging to one of the above-described alternative imaging methods can cost a dental office thousands of dollars in equipment and training. Nonetheless, it would be desirable to facilitate viewing of a dental x-ray on a monitor.

The present invention has recognized these prior art drawbacks, and has provided the below-disclosed solutions to one or more of the prior art deficiencies.

SUMMARY OF THE INVENTION

A camera cap for an intra oral camera, includes an opaque base plate and a hole that is established by the base plate. The camera cap is affixable to the intra oral camera such that any light produced by the intra oral camera is blocked while imaging is allowed through the hole.

Preferably, the camera cap includes a first side plate that extends from the base plate. Also, the camera cap includes a second side plate that extends from the base plate in the same direction as the first side plate. Moreover, the camera cap includes an adhesive layer. The adhesive layer can be disposed on the base plate and/or the side plates. A protective layer is disposed on the adhesive layer. Alternatively, a detent is established by the first side plate and the second side plate and the camera cap can be snappingly engaged with to the camera.

In another aspect of the present invention, a dental imaging system includes an intra oral camera that has a head with one or more lights and a lens. A monitor is connected to the camera and displays images from the intra oral camera. Also, a camera cap is disposed on the head of the intra oral camera. In this aspect, the camera cap blocks the light, but not the lens.

In yet another aspect of the present invention, a method for capturing images from dental x-rays includes providing an intra oral camera that has a head. A monitor is also provided and it receives images from the intra oral camera. The intra oral camera is placed near a dental x-ray such that an image of the dental x-ray is displayed at the monitor.

The present invention will now be described, by way of example, with reference to the accompanying drawings, in which:

BRIEF DESCRIPTION OF THE DRAWINGS

The present invention will now be described, by way of example, with reference to the accompanying drawings, in which.

DESCRIPTION IF THE PREFERRED EMBODIMENTS

Figure 1:
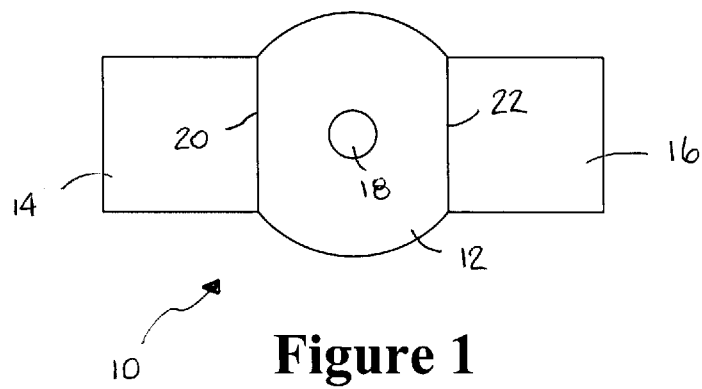
FIG. 1 is a front plan view of an unfolded camera cap.

Referring initially to FIG. 1, a preferred embodiment of a camera cap for an intra oral camera is shown and generally designated 10. FIG. 1 shows that in a preferred embodiment, the camera cap 10 includes a flat base plate 12 from which a preferably flat first side plate 14 and a preferably flat second side plate 16 extend. In a preferred embodiment, the camera cap 10 is made from an opaque paper laminate and is in an unfolded configuration prior to use, as shown in FIG. 1.

As shown in FIG. 1, the base plate 12 of the camera cap 10 is formed with a hole 18. FIG. 1 shows that the hole 18 is established in the base plate 12, but it is to be understood that the hole 18 can be established anywhere within the base plate 12 so that it is aligned with the lens of an intra oral camera, described below, when the cap 10 is engaged with the camera. The diameter of the hole 18 is established so that it is approximately the same size as the lens.

Figure 2:
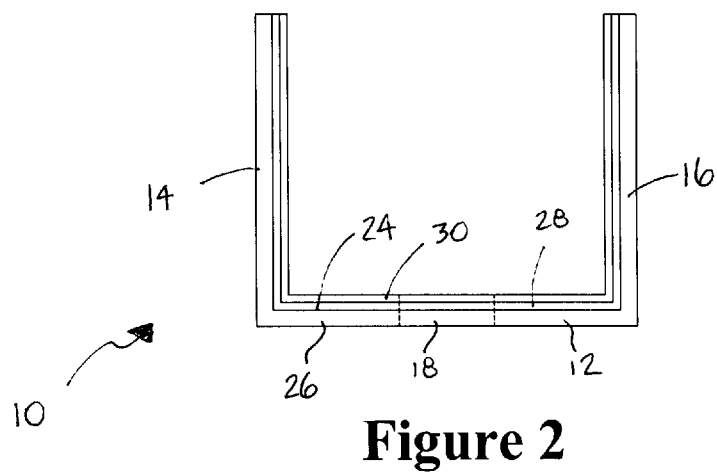
FIG. 2 is a side plan view of a folded camera cap.

FIG. 2 shows that the camera cap 10 can be folded to establish a "U" shape. This can be accomplished by folding the first side plate 14 along line 20 in FIG. 1 and by folding the second side plate 16 along line 22 in FIG. 1. As shown in FIG. 2, when the camera cap 10 is folded in the "U" shape, it establishes an interior surface 24 and an exterior surface 26. In a preferred embodiment, the interior surface 24 of the camera cap 10 includes a non-permanent adhesive layer 28 that can temporarily attach the camera cap 10 to the head of an intra oral camera, described below. Moreover, a removable protective layer 30 is disposed on the adhesive layer. The protective layer 30 prevents the camera cap 12 from sticking to an adjacent camera cap 12 when stacked in a dispenser. Also, the protective layer 30 can be removed to expose the adhesive layer 28 before the camera cap 10 is installed on an intra oral camera, described below. It is to be understood that the adhesive layer 28 can be disposed on the base plate 12 only or the side plates 14, 16 only. It is to be understood that the first side plate 14 and the second side plate 16 can be omitted from the construction of the camera cap 10 so that the camera cap 10 only includes the base plate 12 with an adhesive layer 28.

Figure 3:
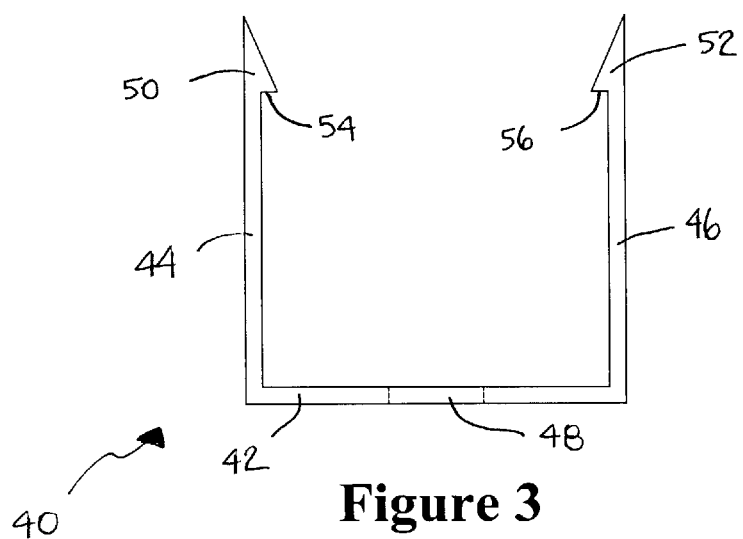
FIG. 3 is a side plan view of an alternative camera cap.

Referring to FIG. 3, an alternative embodiment of a camera cap is shown and generally designated 40. FIG. 40 shows that the camera cap 40 includes a generally flat base plate 42. A flat first side plate 44 and a flat second side plate 46 extend perpendicularly from the base plate 42. As shown, the base plate 42 establishes a hole 48 that can be aligned with a intra oral camera lens, described below.

As shown in FIG. 3, the first side plate 44 and the second side plate 46 establish respective ends 50, 52. Each end 50, 52 of the side plates 44, 46 is formed with a detent 54, 56 that is designed to snappingly engage the head of an intra oral camera, described below, to temporarily attach the camera cap 40 thereto. It is to be understood that this embodiment of the camera cap 40 is preferably manufactured from opaque plastic, but it can be manufactured from metal or any other similar material well known in the art.

Figure 4:
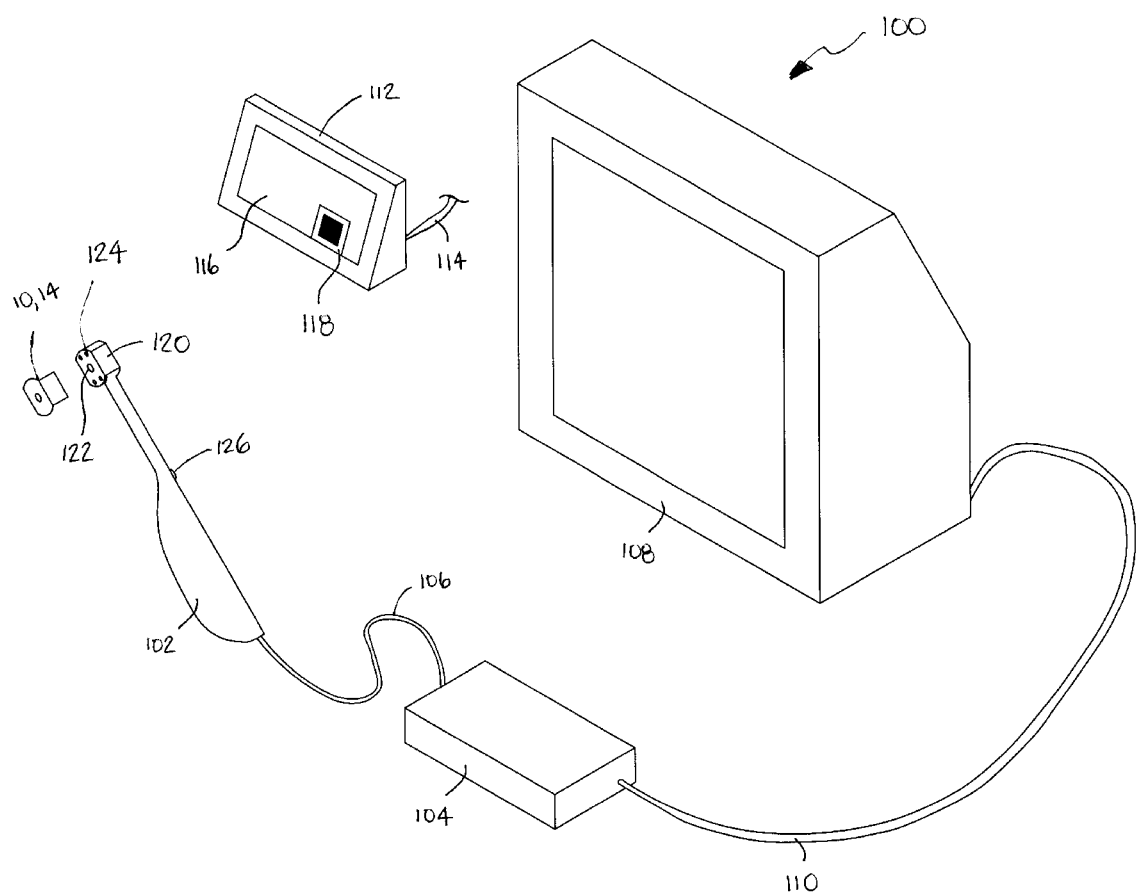
FIG. 4 is a perspective view of a dental imaging system.

Referring now to FIG. 4, a dental imaging system is shown and generally designated 100. FIG. 4 shows that the system 100 includes an intra oral camera 102 that is connected to a controller 104 via a cord 106. In turn, the controller 104 is connected to a monitor 108 via a cord 110. FIG. 4 shows that the system also includes a dental x-ray view box 112 that can be connected to a power source via cord 114. The view box 112 includes a view screen 116 on which a dental x-ray 118 can be placed. The view screen 116 can be illuminated in order to back-light the dental x-ray 118.

FIG. 4 shows that the intra oral camera 102 includes a head 120 in which a camera lens 122 is incorporated. As shown, the camera lens 122 can be surrounded by preferably four lights 124 for illuminating a viewing area, e.g., the inside of a patient's mouth. The intra oral camera 102 can also include a freeze frame button 126.

Using the system 100 described above, a dentist can use the intra oral camera 102 to view the anatomy within a patient's mouth. The lights 124 illuminate the area that the dentist is viewing and a video image of the patient's mouth captured by the camera 102 is displayed at the monitor 108. It can be appreciated that the freeze frame button 126 can be toggled to obtain a still image from the video images captured by the intra oral camera 102.

As shown in FIG. 4, either embodiment of the. above-described camera cap 10, 40 can be placed over the head 120 of the camera 102 in order to block the light provided by the lights 124, but allow the camera 102 to still capture images through the hole 18, 48.

It is to be understood that when using the first embodiment of the camera cap 10, the camera cap 10 can be folded to form a "U" shape and then affixed to the head 120 of the camera 102 after the protective layer 30 is removed to expose the adhesive layer 28. After use, the camera cap 10 can be removed from the camera 102 without any damage to the camera 102 and then discarded.

On the other hand, when using the second embodiment of the camera cap 40, the camera cap 40 can simply be snapped in placed over the head 120 of the camera 102 such that the detents 54, 56 formed by the ends 50, 52 of the side plates 44, 46 engage back edges of the head 120. Thus, the camera cap 40 can be attached to the camera head 120 in order to block the lights 124, but not the lens 122. When imaging is complete, the camera cap 40 can be disengaged from the head 120 of the intra oral camera 102 and discarded or saved for later use.

With the camera cap 10, 40 properly in place, the intra oral camera 102 can be placed near the dental x-ray 118 on the viewing box 112 in order to capture the image of the dental x-ray 118 on the monitor 108, e.g., by toggling the freeze frame button 126. Thus, a dentist can obtain a large image from the dental x-ray 118 and maximize the effectiveness of his or treatment and diagnosis of a patient by displaying an image of the x-ray 118 on the monitor 108. The camera cap 10, 40 of the present invention effectively masks the lights 124 within the camera head 120 and eliminates the glare and distortion the lights 124 can produce if they shine directly on the dental x-ray 118.

With the configuration of structure described above, it is to be appreciated that the configuration of the camera cap 10, 40 can be used in conjunction with a intra oral camera 102 in order to relatively easily display enlarged images from a dental x-ray 118 on a monitor 108.

While the particular CAMERA CAP FOR AN INTRA ORAL CAMERA as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

I claim:

1. A camera cap for an intra oral camera, comprising:
   an opaque base plate;
   a hole established by the base plate; and
   an intra oral camera, the camera cap being affixable to the intra oral camera such that any light produced by the intra oral camera is blocked while imaging is allowed through the hole.

2. The camera cap of claim 1, further comprising:
   a first side plate extending from the base plate.

3. The camera cap of claim 2, further comprising:

a second side plate extending from the base plate in the same direction as the first side plate.

4. The camera cap of claim 3, further comprising:

an adhesive layer disposed on the base plate.

5. The camera cap of claim 3, further comprising:

an adhesive layer disposed on the base plate, the first side plate and the second side plate.

6. The camera cap of claim 3, further comprising:

an adhesive layer is disposed on the first side plate and the second side plate.

7. The camera cap of claim 4, further comprising:

a protective layer disposed on the adhesive layer.

8. The camera cap of claim 3, further comprising:

a detent established by the first side plate; and a detent established by the second side plate, whereby snapping engagement with the camera is facilitated.

9. A dental imaging system, comprising:

an intra oral camera including at least one head having at least one light and at least one lens;

a monitor connected to the camera, the monitor displaying images from the intra oral camera; and a camera cap disposed on the head of the intra oral camera, the camera cap blocking the light, but not the lens.

10. The system of claim 9, further comprising:

a controller connected to the intra oral camera and the monitor.

11. The system of claim 9, wherein the camera cap comprises:

an opaque base plate; and a hole established by the base plate, the base plate blocking the light and the hole allowing imaging through the lens.

12. The system of claim 11, wherein the camera cap further comprises:

a first side plate extending from the base plate.

13. The system of claim 12, wherein the camera cap further comprises:

a second side plate extending from the base plate in the same direction as the first side plate.

14. The system of claim 13, wherein the camera cap further comprises:

an adhesive layer disposed on the base plate.

15. The system of claim 14, wherein the camera cap further comprises:

an adhesive layer disposed on the base plate, the first side plate and the second side plate.

16. The system of claim 13, wherein the camera cap further comprises:

an adhesive layer is disposed on the first side plate and the second side plate.

17. The system of claim 14, wherein the camera cap further comprises:

a protective layer disposed on the adhesive layer.

18. The system of claim 13, wherein the camera cap further comprises:

a detent established by the first side plate; and a detent established by the second side plate.

19. A method for capturing images from dental x-rays, comprising the acts of:

providing an intra oral camera having a head;

providing a monitor, the monitor receiving images from the intra oral camera;

placing the intra oral camera near a dental x-ray such that an image of the dental x-ray is displayed at the monitor; and installing a camera cap on the intra oral camera, the camera cap blocking light emanating from the intra oral camera while allowing imaging by the intra oral camera.

20. The method of claim 19, further comprising the act of:

toggling a freeze frame button at the intra oral camera to capture a still image of the dental x-ray at the monitor.

21. The method of claim 20, further comprising the acts of:

providing a view box for the dental x-ray; and placing the dental x-ray on the view box.

22. The method of claim 21, further comprising the act of: illuminating the view box to back light the dental x-ray.

* * * * *